US007136717B2

(12) United States Patent
Noack

(10) Patent No.: US 7,136,717 B2
(45) Date of Patent: Nov. 14, 2006

(54) METHOD AND DEVICE FOR THE CONTROL OF A ROTARY TABLET FORMING MACHINE

(75) Inventor: Ulrich Noack, Schwanebeck-West (DE)

(73) Assignee: Korsch AG, Berlin (DE)

( * ) Notice: Subject to any disclaimer, the term of this patent is extended or adjusted under 35 U.S.C. 154(b) by 158 days.

(21) Appl. No.: 10/774,641

(22) Filed: Feb. 9, 2004

(65) Prior Publication Data

US 2004/0156940 A1 Aug. 12, 2004

(30) Foreign Application Priority Data

Feb. 10, 2003 (EP) .................................. 03090036

(51) Int. Cl.
*G06F 15/46* (2006.01)

(52) U.S. Cl. ...................... 700/108; 700/110; 700/174; 425/186; 425/345

(58) Field of Classification Search ................ 700/108, 700/110, 174; 425/186, 345
See application file for complete search history.

(56) References Cited

U.S. PATENT DOCUMENTS

| | | | | |
|---|---|---|---|---|
| 4,100,598 | A * | 7/1978 | Stiel et al. | 700/206 |
| 4,362,491 | A * | 12/1982 | Livingstone | 425/186 |
| 4,570,229 | A * | 2/1986 | Breen et al. | 700/206 |
| 4,988,275 | A * | 1/1991 | Hinzpeter et al. | 425/186 |
| 5,004,413 | A * | 4/1991 | Stopforth | 425/182 |
| 5,178,948 | A * | 1/1993 | Haller | 428/402 |
| 5,221,250 | A * | 6/1993 | Cheng | 494/7 |
| 5,699,273 | A * | 12/1997 | Hinzpeter et al. | 702/105 |
| 5,838,571 | A * | 11/1998 | Lewis | 700/206 |
| 5,913,371 | A * | 6/1999 | Jenne | 175/27 |
| 6,186,762 | B1 * | 2/2001 | Matthes | 425/193 |
| 6,361,302 | B1 * | 3/2002 | Hinzpeter et al. | 425/182 |
| 6,482,338 | B1 * | 11/2002 | Levin et al. | 264/40.1 |
| 2002/0004472 | A1 * | 1/2002 | Holderbaum et al. | 510/290 |
| 2004/0056375 | A1 * | 3/2004 | Bubb | 264/40.5 |
| 2005/0200038 | A1 * | 9/2005 | Vogeleer et al. | 264/40.1 |

FOREIGN PATENT DOCUMENTS

EP 0 698 481 B1 2/1999

* cited by examiner

*Primary Examiner*—Leo Picard
*Assistant Examiner*—Michael D. Masinick
(74) *Attorney, Agent, or Firm*—Birch, Stewart, Kolasch & Birch, LLP

(57) ABSTRACT

A method and a device controls a rotary tablet forming machine having a rotor. The rotor is capable of being rotated by a drive unit. The rotor includes at least one matrix with allocated upper punches and lower punches and a pressing force, to act on the press mass filled into the at least one matrix is determined. The determined pressing force ($PK_{actual}$) is compared with a pre-specifiable limit value ($PK_{limit}$) and, with a level going below the limit value ($PK_{limit}$). Then, required speed ($n_r$) of the rotor can be reduced to a speed below the rated speed ($n_{r\text{-}rated}$).

10 Claims, 2 Drawing Sheets

METHOD AND DEVICE FOR THE CONTROL OF A ROTARY TABLET FORMING MACHINE

This non-provisional application claims priority under 35 U.S.C. § 119(a) on Patent Application No. 03090036.9 filed in Europe on Feb. 10, 2003, the entire contents of which are hereby incorporated by reference.

FIELD OF THE INVENTION

The invention concerns a method and a device for the control of a rotary tablet forming machine where a rotor is capable of being rotated by means of a drive unit, the rotor including at least one matrix with allocated upper punches and lower punches and a pressing force, acting on the press mass filled into the one matrix at least, is determined.

DESCRIPTION OF THE BACKGROUND ART

Rotary tablet forming machines of the category-related type are known. A typical factor here is that, upon starting the drive unit, the rotor is brought from standstill position to its rated speed. By way of at least one filling shoe, the matrixes are filled with the press mass and, depending on the angular position of the rotor, the lower and the upper punches which are guided by guide curves are moved axially to the matrixes. The upper and lower punches are directed past at least one press station, normally a pre-press station and a main press station. At that location, the upper and lower punches are directed past stationary arranged press rollers, essentially tangential, so that a pressing force can be applied onto the press mass filled into the matrixes.

Setting and measuring the pressing force is known, for example from EP 0 698 481 B1. In this case, there is an essential correlation between the measured maximum pressing force and the mass of the press mass filled into the matrixes under the prerequisite of the same material properties of the press mass. There is, in this case, a direct correlation between the tablet weight and the pressing force required for the manufacture of the tablets. In dependence on the material to be pressed, a certain pressing force is allocated to each tablet weight with a tablet form pre-specified by the press tools and a set tablet height. If the filling volume, and subsequently the tablet weight, fluctuates at a constant tablet height, a pressing force change results therefrom in direct dependence.

If all matrixes in a rotary tablet forming machine are normally filled with press mass up to the press station (meaning, up to the pressure roller), pressure rollers and rotor during start-up are accelerated to the rated speed in the same time period. This is attributable to the fact that each punch, as a result of the rotational movement of the rotor, is drawn past under the pressure roller—touching this—and her via the rotation of the punches the acceleration of the pressure roller is effected so that the acceleration of the pressure roller is directly dependent on the rotational speed of the punches.

This correlation between acceleration of the rotor and acceleration of the pressure rollers is then disadvantageous if, upon rotation of the rotor, the matrixes arriving at the press station (pressure rollers) are not or are only partially filled with press mass.

This can be the case, for example, during the start-up of the rotary tablet forming machine after cleaning or in the event of an interruption of the material feed by way of the filling shoe(s) with press mass.

If the rotary tablet forming machine is now started up with non-filled or with only partially filled matrixes, the upper and lower punches in the press station do not touch or only partially touch the pressure rollers. By starting up the drive unit the rotor with the punch is, however, accelerated to its rated speed. If a first punch with a first orderly filled matrix now accesses the press station, the punch or the punch couple, corresponding to the rotor already accelerated to rated speed, hits the pressure roller which is not yet or only insufficiently accelerated. In this case, the punch has an abrupt impact on the pressure roller so that suddenly a high kinetic energy has to be absorbed by the pressure roller and the punches involved. This can lead to damage of the pressure rollers and/or the punches.

BRIEF SUMMARY OF THE INVENTION

The invention is therefore based on the task assignment of creating a method and a device of the category-related type, by means of which such damage can be avoided.

Because of the fact that the determined pressing force is compared with a pre-specifiable limit value and, if a rate drops below the limit value, the required speed of the rotor is reduced to a speed below the rated speed, it is advantageously possible to synchronise the acceleration of the rotor and the acceleration of the pressure rollers in every operating situation to their rated speeds. In this way it is particularly avoided that the rotor is accelerated to its rated speed before the pressure rollers. Subsequently, an abrupt impact of the punches onto the pressure rollers is avoided and, with this, the damage possibilities existing with the state of the art of pressure rollers and/or punches are also avoided.

In a preferred embodiment of the invention, it is envisaged that the speed of the rotor is speed-controlled from its standstill position or its rated speed. In this way, the avoidance of the above-mentioned damage in every operating situation of the rotary tablet forming machine is possible.

Because of the fact that the rotary tablet forming machine includes a control device or similar for activating a drive unit of a rotor of the rotary tablet forming machine, a device for determining a pressing force as well as a means for comparing the determined pressing force with a pre-specifiable pressing force and at least one means for pre-specifying a required speed of the rotor in dependence of the comparison of the determined pressing force with the pre-specifiable pressing force, it is advantageously possible to implement in an uncomplicated manner. The control function in the rotary tablet forming machine which, depending on a filling degree of matrixes of the rotor, controls a required speed of the rotor. In this way a run-up, in particular, of the rotor adapted to the filling degree of the matrixes is made possible so that, in particular, mechanical loading/stressing/damage of pressure rollers and/or press punches can be avoided.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is explained as follows in greater detail with an embodiment as based on the relevant drawings, which are given by way of illustration only, and thus are not limitative of the present invention. The figures show the following.

DETAILED DESCRIPTION OF THE INVENTION

Rotary tablet forming machines of the type referred to here are generally known. Within the framework of this description, therefore, more detailed attention is not given for the fundamental structural arrangement and basic functions.

Figure 1:
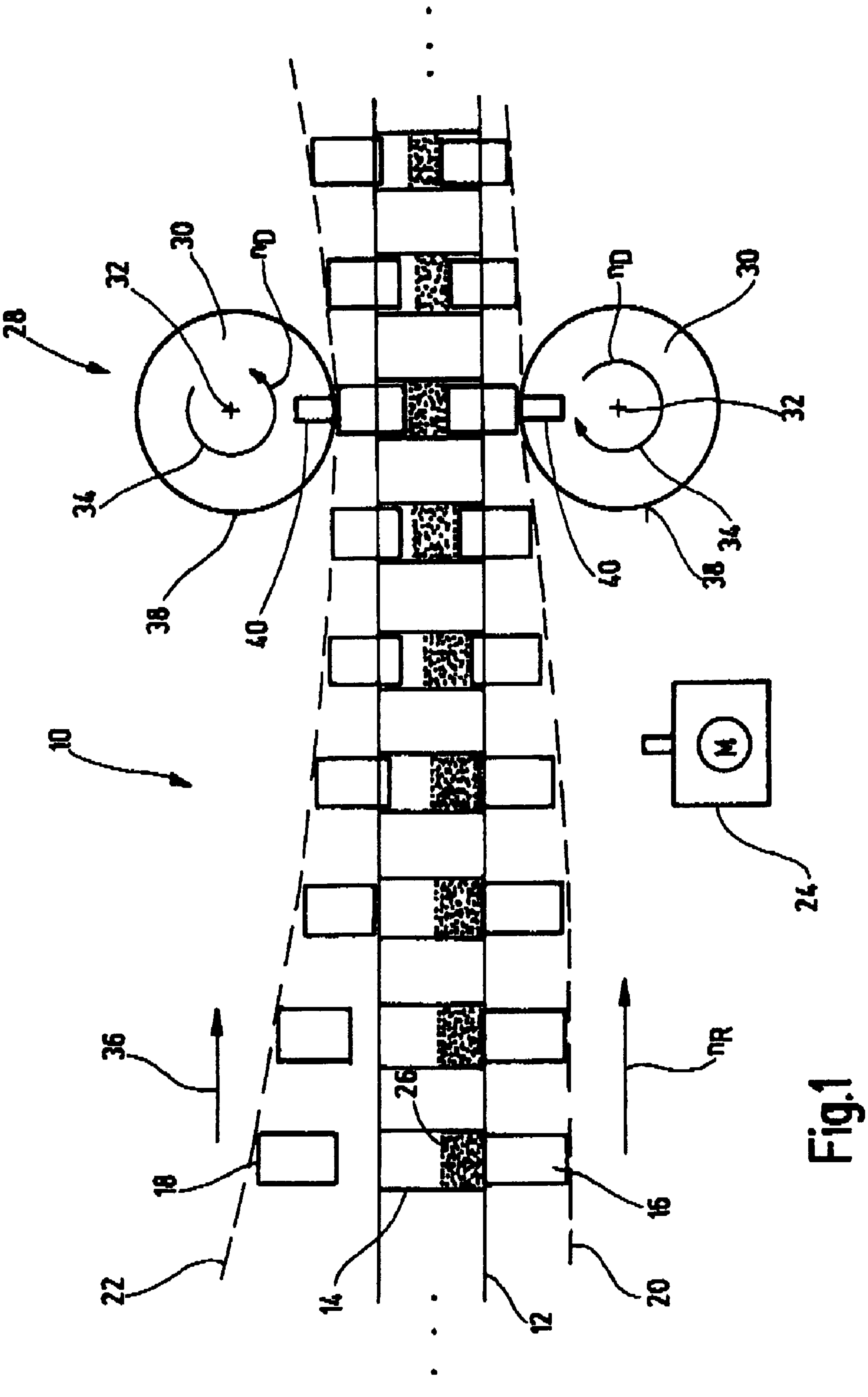
FIG. 1: a partially schematic illustration of a rotary tablet forming machine.

FIG. 1 shows in a schematic partial view the configuration of a rotor 12 of a rotary tablet forming machine with an overall designation 10. The rotor 12 has a large number of spaced matrixes 14 around its periphery. To each matrix 14 there is allocated a lower punch 16 and an upper punch 18 which are guided by guide curves 20 and 22, respectively, indicated here. Rotor 12 and lower punch 16 as well as upper punch 18 here have a synchronous rotation around the rotating axis of the rotor 12. The rotor 12 can be rotated by an electric drive unit 24 which is only indicated here.

A press mass 26, which is only indicated here, is filled into the matrixes 14 by way of a filling facility, a so-called fill-in shoe. In the normal operating mode of the rotary tablet forming machine 10, the press mass 26 is filled in over the entire height of the matrix 14. The filling height can, for example, be defined by the height location of the lower punch 16 at a wiping station not shown here. In the example as illustrated, a non-normal filling is assumed. The press mass 26 is filled into the matrixes 14 only up to a partial height. It is also conceivable that absolutely no press mass 26 is filled into the matrixes 14—for the non-normal case assumed here. Such circumstances could occur, for example, with a new startup of the rotary tablet forming machine 10 after a cleaning operation, maintenance or similar, or after an interruption of the stock feed of the press mass 26 by way of the filling facility.

In accordance with the course of the guide curves 20 and 22, the lower punches 16 and the upper punches 18 plunge into the matrix 14 and press the press mass 26 to the required tablet or similar.

For this purpose, the lower punches 16 and the upper punches 18 are directed past at least one pressing station 28 which envelops fixed-positioned pressure rollers 30. The pressure rollers 30 are individually trunnion-mounted around a rotating axis 32. The spacing of the pressure rollers 30 to one another is defined and ultimately determines the height of the tablet to be pressed. A drive of the pressure rollers 30 in arrow direction 34—the upper pressure roller 30 anti-clockwise, the lower pressure roller clockwise—is effected by a passing movement of the lower punches 16 and upper punches 18, respectively, according to the movement direction 36 of the rotor 12. The lower punches 16 and the upper punches 18, respectively, come into a surface-to-surface contact with the peripheral surface 38 of the pressure rollers 30 and cause these rollers to rotate, practically carried along. The rotor 12 rotates here at a speed of $n_r$, whereas the pressure rollers 30 rotate at a speed of $n_d$.

As a result of the non-filled or only partially filled matrixes 14, the press mass 26 to be pressed has only an inadequate counter force opposite the punches 16 and 18 in the pressing station 28 and/or in the area immediately before. The result here is that the punches 16 and 18 are accelerated to the rated speed of the rotor 12 due to the rotation of the rotor 12 but, however, as a result of inadequate surface-to-surface contact at the pressure rollers 30, these are not accelerated to their rated speed. If, in this non-normal operating condition, a first punch couple—of the punches 16 and 18—with a normally filled matrix 14 hits the pressure rollers 30, there is a substantial difference between the momentary speeds of the rotor 12 and of the pressure rollers 30, respectively.

Whereas the rotor 12 is already accelerated to its rated speed $n_{r\text{-}rated}$, the pressure rollers 30 only have an actual speed $n_{d\text{-}actual}$ that is far below their rated speed $n_{r\text{-}rated}$. The result here is that the punches 16 and 18 have an impact on the peripheral surfaces 38 of the pressure rollers 30 with great acceleration so that, in consequence, considerable kinetic energy has to be absorbed. This can lead to mechanical damage both on the surfaces 38 of the pressure rollers 30 as well as on the punches 16 and 18, respectively.

In order to prevent this mechanical stress, the following is envisaged:

The pressure rollers 30 are provided in the known manner with measuring data probes 40, with which the momentary pressing force PK is measured. The invention is elucidated further with the schematic illustration in FIG. 2.

Figure 2:
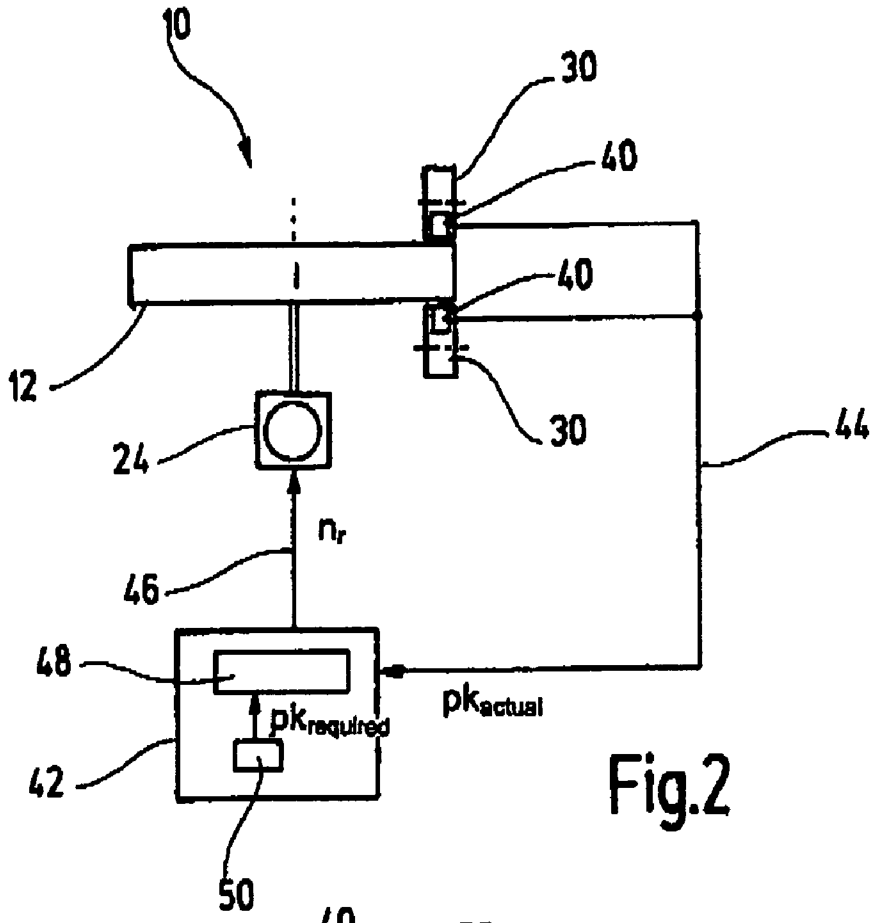
FIG. 2: a block diagram of a device for the control of the rotary tablet forming machine.

FIG. 2 shows the rotor 12 drivable by the electric drive unit 24 as well as the pressure rollers 30 allocated to the rotor 12. The punches are not shown for reasons of clarity. A control unit 42 is allocated to the rotary tablet forming machine 10, and this control unit can take over a large number of control and regulation functions. Finally, only the configuration and function of the control unit 42 as essential for the invention are described.

The control unit 42 is connected to the pressing force probes 40 by way of a signal line 44 and receives a signal $pk_{actual}$ proportionate to the actual pressing force $pk_{actual}$.

The control unit 42 is also connected to the electric drive unit 24 by way of a signal line 46, by way of which the electric drive unit 24 receives a control signal $n_r$, that corresponds to the required speed of the rotor 12 which is to be set.

The control unit 42 includes an arithmetic-logic unit 48, to which the signal $pk_{actual}$ and a signal $pk_{required}$ from a memory facility 50 are sent, corresponding to the required pressing force $pk_{required}$ at the pressure rollers 30.

Figure 3:
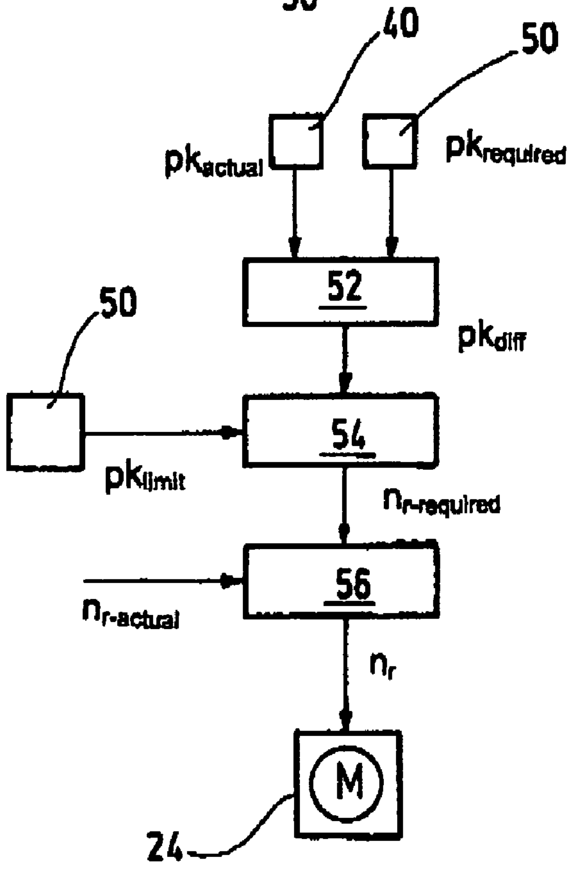
FIG. 3: a control sequence.

In accordance with the schematic illustrated in FIG. 3, the following signal processing is effected.

In a step 52, the actual-signals $pk_{actual}$ sent from the pressing force probes and the required-signal $pk_{required}$ sent from the memory facility 50 are processed. In this case, the difference between the signal $pk_{required}$ and the signal $pk_{actual}$ is measured. This difference signal $pk_{diff}$ is joined up with a signal $pk_{limit}$ in a further step 54. The signal $pk_{limit}$ is also, for example, provided by the memory facility 50. In this case, for example, it can be variably determined as to what extent the pressing force $pk_{limit}$ corresponding to the signal $pk_{limit}$ can deviate from the required pressing force $pk_{required}$. This difference between the pressing force limit value and the pressing force required value can, for example, amount to 10% of the pressing force required value.

If it is now determined in step 54 that the difference between the pressing force actual value and the pressing force required value is greater than the difference between the pressing force required value and the pressing force limit value, meaning, the pressing force actual value drops below the pressing force limit value, a signal $n_{r\text{-}required}$ is generated that corresponds to a required speed $n_r$ of the rotor 12. This required speed is less than the rated speed of the rotor 12 in normal operation. In step 56, the signal $n_{r\text{-}required}$ corresponding to the required speed is joined up with a signal $n_{r\text{-}actual}$ corresponding to the actual speed of the rotor 12. Corresponding to a deviation between actual speed and required speed of the rotor 12, the speed signal $n_r$ is generated and made available to the drive unit 24. This then accelerates the rotor 12 to the pre-specified speed $n_r$.

Based on the explanatory statements given above, it is clear that a speed control of the rotor 12 is effected in dependence of the pressing force. In this way it is achieved that, with an assumed lesser pressing force pk than the required pressing force $pk_{required}$, the rotor does not rotate at its rated speed. Particularly in the case as explained here, that the matrixes 14 are not or are only partially filled with press mass 26, the result is that the rotor 12 rotates at a pre-specifiable minimum speed $n_r$. In this way it is avoided that, upon first impact of lower punch 16 and upper punch 18 of an orderly filled matrix 14, these have an impact on the pressure rollers 30 with the rated speed of the rotor 12. Subsequently, the mechanical stress at this point of time is considerably reduced.

If the punches 16 and 18 of an orderly filled matrix 14 hit the pressure rollers 30, this leads automatically to an increase of the pressing force pk which is measured as actual-pressing force $pk_{actual}$ via the pressing force probes 40. In this way, the difference between the actual pressing force and the required pressing force is reduced so that, according to the schematic as illustrated in FIG. 2 and FIG. 3, the speed of the rotor 12 is increased until this reaches its rated speed.

The solution according to the invention is also suitable for recognising with a rotor 12, rotating at rated speed, if the filling degree of the matrixes 14 with the press mass declines. With a reduction of the filling degree with the press mass 26, the pressing force pk drops at the pressure rollers 30 due to the direct correlations. According to the course as illustrated in FIG. 3, this lowering of the actual pressing force also leads to a reduction of the required speed $n_r$ of the rotor 12. In this case and in accordance with different embodiment variants, either an incremental or continuous reduction of the required speed $n_r$ can be envisaged. In this way, for example, the required speed $n_r$ can be reduced straight away to a pre-specifiable minimum speed $n_{r\text{-}min}$ or in interim steps from the rated speed $n_{r\text{-}rated}$ to the minimum speed $n_{r\text{-}min}$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCED PARTS LIST

10 Rotary tablet forming machine
12 Rotor
14 Matrix
16 Lower punch
18 Upper punch
20 Guide curve
22 Guide curve
24 Electric drive unit
26 Press mass
28 Press station
30 Pressure rollers
32 Rotary axis
34 Arrow direction
36 Movement direction
38 Peripheral surface
40 Measuring data probe
42 Signal line
44 Signal line
46 Signal line
48 Arithmetic-logic unit
50 Memory facility
52 Step
54 Step
56 Step
PK Pressing force
$PK_{required}$ Required pressing force
$PK_{actual}$ Actual pressing force
$PK_{limit}$ Pressing force—limit value
$n_d$ Speed of the pressure rollers
$n_{d\text{-}rated}$ Rated speed
$n_{d\text{-}actual}$ Actual speed
$n_r$ Speed of the rotor
$n_{r\text{-}min}$ Minimum speed
$n_{r\text{-}rated}$ Rated speed
$pk_{actual}$ Proportionate signal
$pk_{required}$ Required signal
$n_r$ Control signal
$n_{r\text{-}required}$ Signal
$n_{r\text{-}actual}$ Signal
$pk_{diff}$ Difference signal

The invention claimed is:

1. A method for control of a rotary tablet forming machine during start-up of the machine, the machine having a rotor rotated by a drive unit, the rotor including at least one matrix with allocated upper punches and lower punches, the method comprising the steps of:

determining a pressing force ($PK_{actual}$) applied to a press mass filled in the at least one matrix by the upper and lower punches;

comparing the pressing force ($PK_{actual}$) with a pre-specified limit value ($PK_{limit}$);

reducing speed of the rotor below a rated speed ($n_{r\text{-}rated}$) to a new, non-zero speed when the pressing force is below the pre-specified limit value to thereby avoid damaging the machine.

2. The method according to claim 1, wherein the step of determining a pressing force ($PK_{actual}$) comprising the step of measuring the actual pressing force.

3. The method according to claim 1, further comprising the step of setting a difference between the limit value ($PK_{limit}$) and a required pressing force ($PK_{required}$).

4. The method according to claim 3, wherein the difference amounts to between 1% and 50%.

5. The method according to claim 3, wherein the difference amounts to between 5% and 20%.

6. The method according to claim 3, wherein the difference amounts to between 8% and 12%.

7. The method according to claim 1, further comprising the step of comparing a required speed ($n_r$) of the rotor with an actual speed of the rotor and then regulating the rotor to the required speed ($n_r$).

8. The method according to claim 1, further comprising the step of speed controlling the rotor from a standstill position.

9. The method according to claim 1, further comprising the step of speed controlling the rotor from a rated speed of the rotor.

10. A device for control of a rotary tablet forming machine during start-up of the machine, the rotary tablet forming machine having a rotor, at least one matrix with allocated upper punches and lower punches and the device comprising a control unit for a drive unit of the rotor, a facility for determining a pressing force (PK) of at least one of the upper and lower punches acting on a press mass in the at least one matrix and means for comparing determined pressing force ($PK_{actual}$) with a pre-specified pressing force ($PK_{limit}$) and at least one means for pre-specifying a required non-zero speed ($n_r$) of die rotor in dependence on the comparison of the determined pressing force ($PK_{actual}$) with the pre-specified pressing force ($PK_{limit}$) to thereby avoid damaging of the rotary table forming machine.

* * * * *